United States Patent [19]
Dezonno

[11] Patent Number: 5,864,615
[45] Date of Patent: Jan. 26, 1999

[54] AUDIO COMMUNICATIONS INFERFACE, METHOD AND COMMUNICATIONS SYSTEM FOR CONNECTING A REMOTE AGENT TO A TELEPHONE SWITCH

[75] Inventor: Anthony J. Dezonno, Downers Grove, Ill.

[73] Assignee: Rockwell International Corporation, Costa Mesa, Calif.

[21] Appl. No.: 535,696

[22] Filed: Sep. 28, 1995

[51] Int. Cl.$^6$ .............................. H04Q 3/64; H04M 7/00; H04M 3/00
[52] U.S. Cl. .......................... 379/265; 370/270; 379/220; 379/308; 379/309
[58] Field of Search ..................................... 379/219, 220, 379/229, 231, 232, 233, 265, 266, 309, 308; 370/270

[56] References Cited

U.S. PATENT DOCUMENTS 5,073,890  12/1991  Danielson ........................... 379/265 X
5,392,345  2/1995  Otto ....................................... 379/265

Primary Examiner—Harry S. Hong
Attorney, Agent, or Firm—Welsh & Katz, Ltd.

[57] ABSTRACT

An audio communications interface 102 provides substantially automatic audio communications between a remote agent telephone 107 and a telephonic switch 104 through a telephonic console 106 connected to the telephonic switch 104. A remote agent dials a specified telephone number on the agent telephone 107 to access the audio communications interface 102. The audio communications interface 102 receives the dialed number from a telephone network 108 connected to the agent telephone 107 and generates a call signal which is transmitted to the telephonic switch 104 through the telephonic console 106. In response to the call signal, the telephonic switch 104 establishes audio communications with the agent telephone 107 through the console 106 and audio communications interface 102. A method for establishing audio communications through the audio communications interface 102 and data communications through an agent terminal 112, a computer network and a host computer 110 with the telephonic switch 104 is provided. In addition, a communications system for providing audio and data communications between a remote agent and the telephonic switch 104 is provided.

17 Claims, 2 Drawing Sheets

AUDIO COMMUNICATIONS INFERFACE, METHOD AND COMMUNICATIONS SYSTEM FOR CONNECTING A REMOTE AGENT TO A TELEPHONE SWITCH

BACKGROUND OF THE INVENTION

The present invention relates generally to telephonic switches and, more particularly, to an audio communications interface, method and communications system for providing audio communications between a remote agent and a telephonic switch through a conventional agent telephone and a conventional telephonic console connected to the telephonic switch. Data communications may further be provided through an agent terminal connected to a host computer which is, in turn, connected to the telephonic switch.

Telephone switching systems employing automatic call distributors (ACD) are increasingly being used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System", the disclosure of which is hereby incorporated by reference.

In order to further increase the flexibility of telephone switching systems, manufacturers have attempted, with some success, to design systems which permit agents to be stationed at remote locations. Data communications are typically established between the ACD and an agent terminal over a computer network, such as a large area network (LAN) or wide area network (WAN). Typically, a host computer receives data from the ACD and transmits the same or additional data over the computer network to the agent terminal.

As is known, agents have communicated through prior ACDs by means of telephonic consoles. The telephonic consoles are directly connected to the ACDs and provide both audio and data communications. In an effort to increase agent flexibility, ACD manufacturers have provided data communications over the just described computer network while concomitantly providing audio communications from the telephonic console over a conventional telephone network to a remote agent telephone.

The remote agent telephone is connected via the telephone network to the telephonic console. Unfortunately, to establish audio communications between the remote agent telephone and the ACD, a particular telephone digit sequence must be entered at the telephonic console. A remote agent therefore dials a telephonic console from a remote agent telephone. In response, a party physically located at the telephonic console dials the particular telephone digit sequence on the telephonic console to establish audio communication between the agent and the ACD and, in turn, callers to the ACD. As is evident, the need for a party to manually establish the audio connection is inefficient and wastes valuable human resources. Furthermore, prior systems provide less than complete functionality at the remote agent location.

Accordingly, there is a need in the art for an audio communications interface and method which substantially automatically provides audio communications between an agent telephone and a telephonic switch through a conventional telephonic console connected to the telephonic switch. A communications system is further needed to provide the aforesaid audio communications and data communications between the remote agent and the telephonic switch.

SUMMARY OF THE INVENTION

This need is met by an audio communications interface and method in accordance with the present invention wherein the audio communications interface audibly interfaces an agent telephone and a telephonic console connected to a telephonic such that an agent may substantially automatically establish audio communications with the telephonic switch by dialing an appropriate telephone number assigned to the telephonic console. A communications system is further provided wherein audio communications are established between a remote agent and a telephonic switch via the audio communications interface and data communications are established between the remote agent and the telephonic switch via an agent terminal connected to a host computer over a computer network.

In accordance with one aspect of the present invention, an audio communications interface is provided for establishing audio communications between a telephonic switch connected to a telephonic console and an agent telephone via a telephone network. The audio communications interface comprises an audio communications circuit for generating a call signal in response to instructions from the agent telephone to establish audio communications with the telephonic switch. A console interface establishes audio communications with the telephonic switch through the telephonic console in response to the call signal thereby establishing audio communications between the telephonic switch and the agent telephone.

In accordance with another aspect of the present invention, a method for providing communications between a telephonic switch and an agent is provided. The agent is associated with an agent telephone and a telephonic console is connected to the telephonic switch. The method comprises the steps of: generating instruction signals by the agent telephone in response to the agent; transmitting the instruction signals over a telephonic network to access an audio communications interface; generating a call signal by the audio communications interface in response to the instruction signals; transmitting the call signal to the telephonic switch via the telephonic console; and establishing audio communications between the telephonic switch and the agent telephone in response to the call signal.

In yet another aspect of the present invention, a communications system for connecting an agent to a telephonic switch is provided. A telephonic console is connected to the telephonic switch. The system comprises an agent telephone and a telephone network connected to the agent telephone for providing communications with the agent telephone. An audio communications interface interfaces the console and the agent telephone through the telephone network to provide communications between the console and the agent telephone. A data system provides data to the agent relating to the telephonic switch.

These and other features and advantages of the present invention will become apparent from the following detailed description, the accompanying drawings and the appended claims.

DETAILED DESCRIPTION OF THE INVENTION

Figure 1:
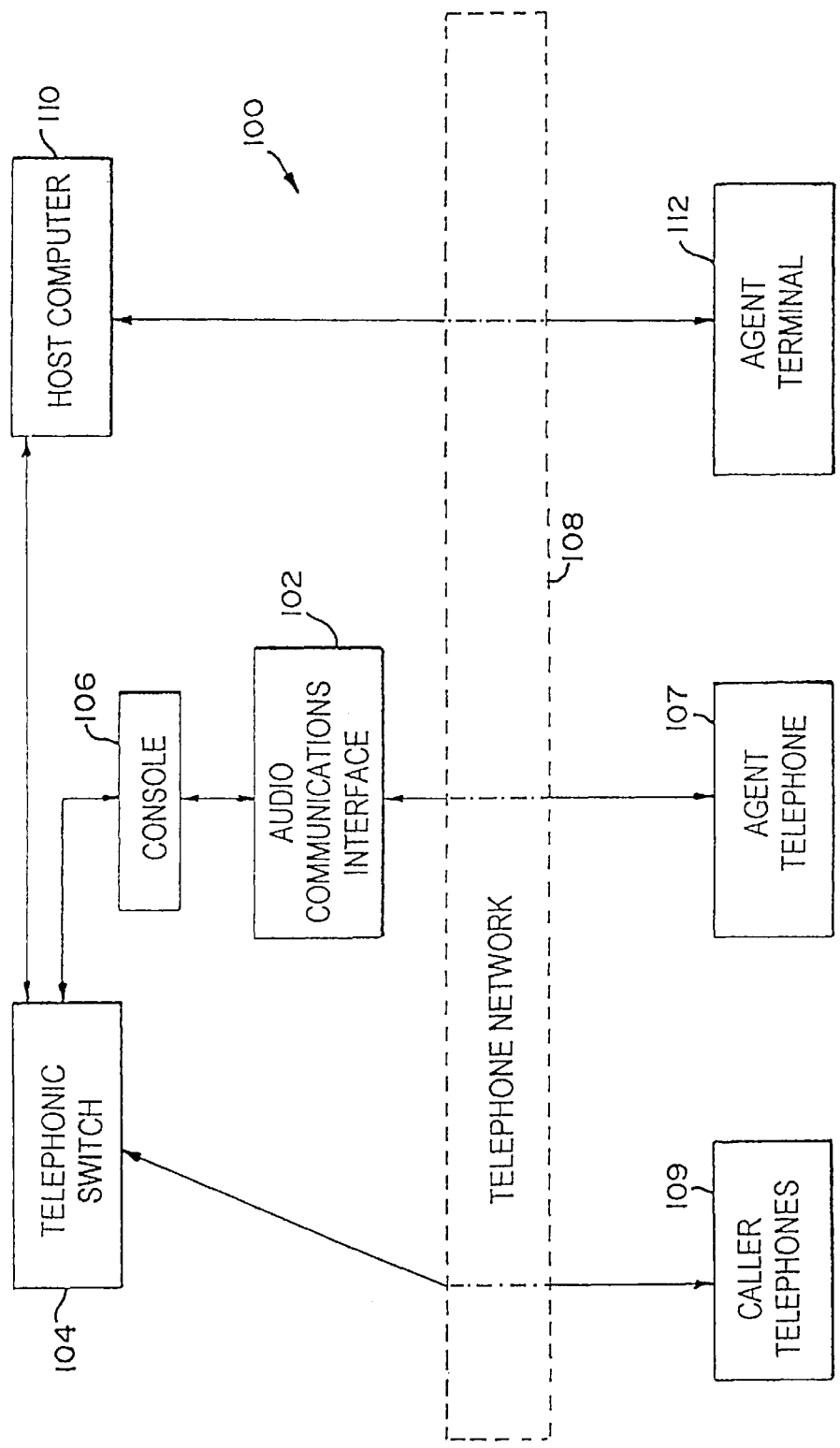
FIG. 1 is a block diagram of a communications system and audio communications interface in accordance with the present invention.

A communications system 100 comprising an audio communications interface 102 or providing communications between a telephonic switch 104 via a console 106 and an gent telephone 107 through a telephone network 108 in accordance with the present invention is shown in FIG. 1. The telephonic switch 104 routes incoming telephone calls from caller telephones 109 to agents positioned at consoles or telephones. The telephonic switch 100 may be any of a number of telephone call switching devices, or systems, such as an automatic call distributor. A host computer 110 is connected to the telephonic switch 104.

Data relating to the operation of the telephonic switch 104 is stored in the host computer 110. In addition, the host computer 110 provides computation capabilities, database access and the like. In addition, these functions may also be performed via the agent terminal 112 in a remote location. The host computer 110 transmits portions of the data to an agent terminal 112 over the telephone network 108 or other computer network. The host computer 110, the agent terminal 112 and the telephone network 108 comprise a data system for transmitting data to a remote agent. Data systems for providing remote data communications with a telephonic switch and for providing call processing functions from a remote agent terminal are known in the art and, as such, will not be further discussed in detail herein.

The console 106 is a conventional device for interfacing with the telephonic switch 104. Agents may generally answer incoming telephone calls routed to them by the switch 104, dial an extension or outbound call or transfer a call from the console 106. The console 106 typically includes an integral LCD display for displaying messages relating to the operation of the telephonic switch 104, programmable soft keys having variable functions, a standard keypad and other predefined keys for performing various functions, such as transferring a call, placing a call on hold and the like. The console 106 also includes an analog jack into which is inserted a headset for providing audio communications with an agent.

In systems where the agent is located at the console 106, the telephonic switch 104 identifies when a headset has been plugged into the console 106. The telephonic switch 104 then transmits instructions to the console 106 to display a "sign in" message on the LCD display. The agent enters the appropriate passwords, or the like, to sign in. The telephonic switch 106 thereafter routes incoming telephone calls to the console 106 until the agent signs off or becomes unavailable by pressing the appropriate key or disconnecting the headset from the console 106. While available, the agent may perform numerous call processing functions, such as transfer calls, answer an incoming telephone call, dial an extension and the like. The present invention advantageously permits an agent to receive incoming telephone calls from a remote location and maintain the above described functional capabilities.

The audio communications interface 102 is connected between the analog jack of the console 106 and a telephone line of the telephone network 108. The audio communications interface 102 emulates the unplugged state of the console 106 when the agent is not connected to the telephonic switch 104 through the agent telephone 107. Consequently, the telephonic switch 104 will not route incoming telephone calls to the console 106 while it is in the unplugged state. The agent dials a designated telephone number to access the audio communications interface 102 through the telephone network 108. In response to the telephone call from the agent, the audio communications interface 102 emulates the plugged in state of the console 106 (i.e. the telephonic switch 104 detects that the headset is plugged into the console 106). An audio line has now, in effect, been established between the telephonic switch 104 via the console 106, audio communications interface 102, the telephone network 108 and the agent telephone 107. However, the switch 104 will not route incoming telephone calls to the agent until the agent signs in.

The agent next signs in by entering the appropriate key sequence on the agent terminal 112. The key sequence is transmitted over the telephone network, or computer network, to the host computer 110 and the telephonic switch 104. The telephonic switch 104 then routes incoming telephone calls to the agent via the console 106. Further, the agent performs all call processing functions through the agent terminal 112 which were previously performed from the console 106. When the agent is finished, the agent logs off the telephonic switch 104 via the agent terminal 112 and hangs up the agent telephone 107. In response to the hanging up the telephone 107, the audio communications interface 102 emulates the unplugged state at the console 106.

Figure 2:
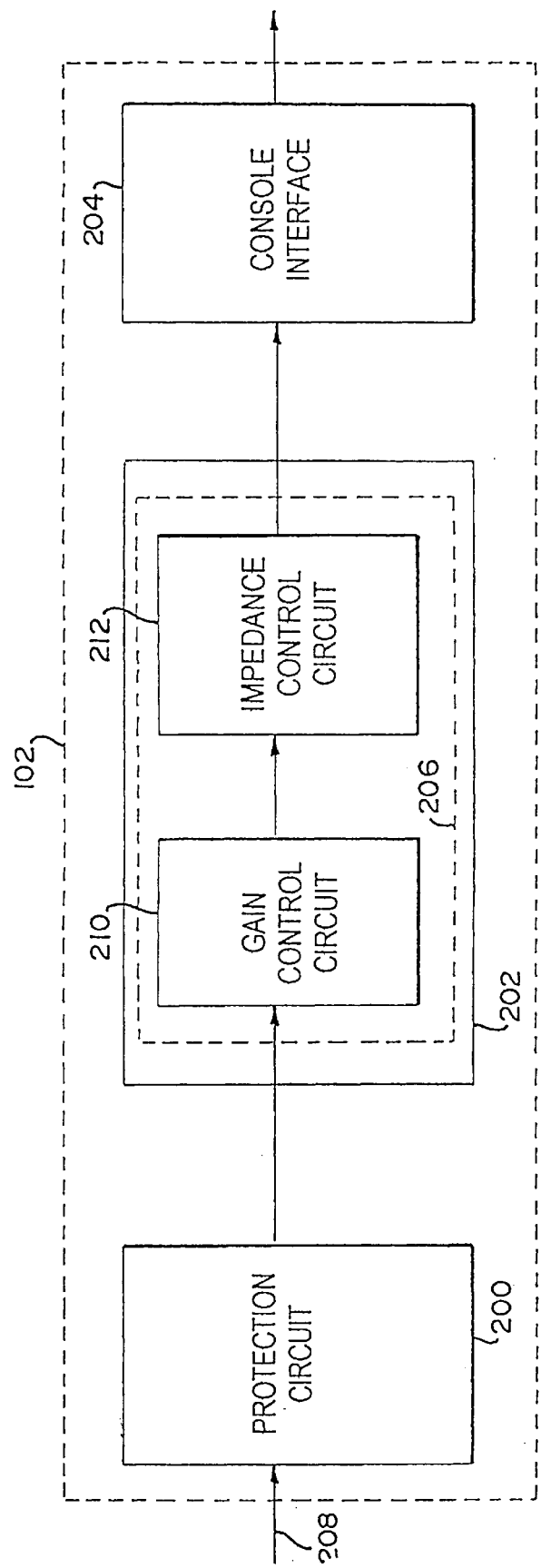
FIG. 2 is a block diagram of the audio communications interface shown in FIG. 1.

The audio communications interface 102 is shown in more detail in FIG. 2. A protection circuit 200 for limiting signal power transmitted through the audio communications interface 102. For example, conventional positive temperature coefficient or slow blow fuses in the protection circuit 200 limit input current to the audio communications interface 102. The protection circuit 200 further comprise conventional positive temperature coefficient or slow blow fuses and resistors. It may also contain a conventional voltage limiting device.

An audio communications circuit 202 generates a call signal in response to instructions from the agent telephone 107 to establish audio communications with the telephonic switch 104 through the console 106. A console interface 204 interfaces the audio communications circuit 202 and the console 106 and establishes audio communications with the telephonic switch 104 through the telephonic console 106 in response to the call signal, thereby establishing audio communications between the telephonic switch 104 and the agent telephone 107. As will be readily apparent to those skilled in the art, the telephonic switch 104 is programmed to identify the call signal and to establish audio communications with the console 106 in response thereto. Further, the telephonic switch 104 is further programmed to accept log on information from the host computer 110 relating to the agent located at the agent terminal 112 and the agent telephone 107. An example of an ACD with which the present invention may be advantageously employed is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System", the disclosure of which is hereby incorporated by reference.

The audio communications circuit 202 comprises a central office subscriber loop interface (COSLI) circuit 206 provides an audio link between an analog trunk 208 of the telephone network 108 and the console 106 through the console interface 204. Preferably, the COSLI circuit 206 comprises a gain control circuit 210 for controlling gain of signals transmitted through the audio communications interface 102. An impedance control circuit 212 in the COSLI circuit 206 controls electrical line impedance of the audio communications interface 102. Both the gain control circuit 210 and the impedance control circuit 212 are programmable. The preferred COSLI circuit 206 is manufactured by the Mitel Corporation of Kanata, Ontario, Canada under part number MH88632.

In accordance with the present invention, a method for providing communications between a telephonic switch 104 and an agent is provided. The agent is associated with an agent telephone 107 while the telephonic switch 104 is connected to a console 106. The agent telephone 107 generates instruction signals, which may be a predetermined telephone number, in response to the agent. The instruction signals are transmitted over a telephonic network 108 to access an audio communications interface 102. The audio communications interface 102 generates a call signal in response to the instruction signals and the call signal is transmitted to the telephonic switch via the telephonic console. Audio communications are thereby established between the telephonic switch and the agent telephone in response to the call signal.

The method preferably comprises the step of connecting an agent terminal 112 associated with the agent to a host computer 110 associated with the telephonic switch 104 to provide data communications between the host computer 110 and the agent terminal 112, preferably over a computer network.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. An audio communications interface for establishing audio communications between a telephonic switch of an automatic call distribution network connected to a locally accessible telephonic console which may alternately be used by an agent to access the telephone switch when the agent is locally situated and a remotely located agent telephone via a telephone network comprising:

an audio communications circuit for generating a call signal emulating a signal generated by a locally situated agent using the locally accessible telephonic console in response to instructions from the remotely located agent telephone to establish audio communications with the telephonic switch; and a console interface for establishing audio communications with the telephonic switch through the locally accessible telephonic console in response to the call signal thereby establishing audio communications between the telephonic switch and the remotely located agent telephone.

2. The audio communications interface as recited in claim 1 comprising a protection circuit for limiting signal power transmitted through the audio communications interface.

3. The audio communications interface as recited in claim 1 wherein the audio communications circuit comprises a central office subscriber loop interface circuit for providing an audio link between an analog trunk of the telephone network and the console interface.

4. The audio communications interface as recited in claim 3 wherein the central office subscriber loop interface circuit comprises a gain control circuit for controlling gain of signals transmitted through the audio communications interface.

5. The audio communications interface as recited in claim 3 wherein the central office subscriber loop interface circuit comprises an impedance control circuit for controlling electrical line impedance of the audio communications interface.

6. A method for providing communications between a telephonic switch and a remotely located agent, the agent being associated with a remotely located agent telephone and the telephonic switch having a locally accessible telephonic console connected thereto, which locally accessible telephonic console may alternately be used by the agent for access to the telephonic switch when the agent is locally situated, the method comprising the steps of:

generating instruction signals by the remotely located agent telephone in response to the agent;

transmitting the instruction signals over a telephonic network to access an audio communications interface coupled to the locally accessible telephone console;

generating a call signal emulating a locally situated agent by the audio communications interface in response to the instructions signals;

transmitting the call signal to the telephonic switch via the locally accessible telephonic console; and establishing audio communications between the telephonic switch and the remotely located agent telephone in response to the call signal.

7. The method as recited in claim 6 comprising the step of:

connecting an agent terminal associated with the agent to a host computer associated with the telephonic switch to provide data communications between the host computer and the agent terminal.

8. The method as recited in claim 7 wherein the step of connecting comprises the step of:

sending an identification signal from the agent terminal over a computer network to the host computer.

9. The method as recited in claim 7 wherein the step of connecting comprises the step of:

sending an identification signal from the agent terminal over a telephonic network to the host computer.

10. A communications system for connecting an agent in a remote location to a telephonic switch of an automatic call distributor, the telephonic switch having a console connected thereto, which may alternately be used by the agent to access the telephonic switch when the agent is locally situated, the system comprising:

a remotely located agent telephone which may be used by the agent to receive calls through the telephonic switch of the automatic call distributor;

a telephone network connected to the remotely located agent telephone for providing communications with the remotely located agent telephone;

an audio communications interface for interfacing with the console accessible by a locally situated agent and the remotely located agent telephone through the telephone network to provide communications between the console and the remotely located agent telephone; and a data system for providing data to the agent relating to the telephonic switch.

11. The communications system as recited in claim 10 wherein the data system comprises:

a host computer for storing data associated with the telephonic switch; and an agent terminal associated with the agent for retrieving data from the host computer relating to the telephonic switch and for presenting the retrieved data to the agent.

12. The communications system as recited in claim 11 wherein the data system comprises a computer network over which the host computer and the agent terminal transmit data between one another.

13. The communications system as recited in claim 10 wherein the audio communications interface comprises:

an audio communications circuit for generating a call signal in response to instructions from the agent telephone to establish audio communications with the telephonic switch; and a console interface for establishing audio communications with the telephonic switch through the telephonic console in response to the call signal thereby establishing audio communications between the telephonic switch and the agent telephone.

14. The audio communications interface as recited in claim 11 comprising a protection circuit for limiting signal power transmitted by the audio communications interface.

15. The audio communications interface as recited in claim 11 wherein the audio communications circuit comprises a central office subscriber loop interface circuit for providing an audio link between an analog trunk of the telephone network and the console interface.

16. The audio communications interface as recited in claim 15 wherein the central office subscriber loop interface circuit comprises a gain control circuit for controlling gain of signals transmitted through the audio communications interface.

17. The audio communications interface as recited in claim 15 wherein the central office subscriber loop interface circuit comprises an impedance control circuit for controlling electrical impedance of the audio communications interface.

* * * * *